US011549849B2

(12) United States Patent
Johnson et al.

(10) Patent No.: US 11,549,849 B2
(45) Date of Patent: Jan. 10, 2023

(54) IMAGE PROCESSING ARRANGEMENT PROVIDING A COMPOSITE IMAGE WITH EMPHASIZED SPATIAL PORTIONS

(71) Applicant: Savox Communications Oy Ab (Ltd), Espoo (FI)

(72) Inventors: Joel R. Johnson, Lincoln, NE (US); Jaakko Havola, Espoo (FI)

(73) Assignee: SAVOX COMMUNICATIONS OY AB (LTD), Espoo (FI)

( * ) Notice: Subject to any disclaimer, the term of this patent is extended or adjusted under 35 U.S.C. 154(b) by 115 days.

(21) Appl. No.: 16/948,358

(22) Filed: Sep. 15, 2020

(65) Prior Publication Data

US 2020/0408603 A1    Dec. 31, 2020

Related U.S. Application Data

(63) Continuation-in-part of application No. 16/355,480, filed on Mar. 15, 2019, now abandoned.

(51) Int. Cl.
| | |
|---|---|
| G01J 5/02 | (2022.01) |
| H04N 5/33 | (2006.01) |
| G01J 5/04 | (2006.01) |
| G01J 5/00 | (2022.01) |
| G01J 5/48 | (2022.01) |

(52) U.S. Cl.
CPC ............ G01J 5/0265 (2013.01); G01J 5/04 (2013.01); H04N 5/33 (2013.01); *G01J 5/485* (2022.01); *G01J 2005/0077* (2013.01)

(58) Field of Classification Search
CPC .. G01J 5/0265; G01J 5/04; G01J 5/485; G01J 2005/0077; G01J 5/025; G01J 5/0859; H04N 5/33; H04N 5/332
See application file for complete search history.

(56) References Cited

U.S. PATENT DOCUMENTS

| | | | |
|---|---|---|---|
| 10,823,553 B1 * | 11/2020 | Ruther | H04N 5/232 |
| 2018/0035606 A1 * | 2/2018 | Burdoucci | H04N 5/232935 |
| 2018/0054573 A1 * | 2/2018 | Handley | G01J 5/025 |
| 2018/0268237 A1 * | 9/2018 | Stanimirovic | G06T 7/11 |

FOREIGN PATENT DOCUMENTS

WO    2016/182961 A1    11/2016

OTHER PUBLICATIONS

European Search Report issued in European Patent Application No. 20 16 2963 dated Jul. 23, 2020.

* cited by examiner

*Primary Examiner* — Siamak Harandi
(74) *Attorney, Agent, or Firm* — Nixon & Vanderhye

(57) ABSTRACT

According to an example, a technique for image processing is provided, the technique comprising: obtaining a first image and a second image that at least partially illustrate the same real-world scene, wherein the first image comprises a visible light image and the second image comprises a thermal image; identifying one or more spatial portions of the second image that represent a predefined temperature range; identifying one or more spatial portions of the first image that illustrate the same portions of the real-world scene as illustrated in the identified one or more spatial portions of the second image; and deriving, based on the first image, a composite image wherein the identified one or more spatial portions of the first image are emphasized.

20 Claims, 3 Drawing Sheets

200

Obtain a first image and a second image that at least partially illustrate the same real-world scene, wherein the first image comprises a visible light image and the second image comprises a thermal image
202

Identify one or more spatial portions of the second image that represent a predefined temperature range
204

Identify one or more spatial potions of the first image that illustrate the same portions of the real-world scene as illustrated in the identified one or more spatial portions of the second image
206

Derive, based on the first image, a composite image wherein the identified one or more spatial portions of the first image are emphasized
208

Provide the composite image for rendering via a display
210

Figure 3

IMAGE PROCESSING ARRANGEMENT PROVIDING A COMPOSITE IMAGE WITH EMPHASIZED SPATIAL PORTIONS

FIELD OF THE INVENTION

The present invention relates to processing of respective pieces of image data obtained from a visual light camera and from a thermographic camera that at least partially share a field of view.

BACKGROUND

For example many search and surveillance solutions at least partially rely on visual information obtained via usage of a camera assembly that may include one or more camera modules or camera units that may be applied to capture still images and/or video stream depicting a location of interest. Such solutions involve portable devices that may be brought to the site of usage to capture images/video to depict locations of interest that may be non-accessible for direct visual inspection or fixed installations arranged to constantly monitor an area or space of interest.

A specific example of using such a camera assembly involves so-called search camera device, such as Savox SearchCam 3000. Such a device involves a camera assembly arranged in one end of an elongated shaft and a display unit arranged in or close to another end of the shaft, which display unit is arranged to display the current camera view to a user of the search camera device e.g. to enable locating victims or items of interest in collapsed buildings, inspecting underwater locations or objects, etc. Some search camera devices enable switching between normal camera operation and infrared camera operation in order to provide the user with the possibility of making use the part of the electromagnetic spectrum that provides the most useful visual information under the current operating conditions.

SUMMARY

An object of the present invention is to provide a technique that enables obtaining enhanced visual information for improved detection of objects of interest when used e.g. in a search camera device of a type described in the foregoing.

In the following a simplified summary of some embodiments of the present invention is provided in order to facilitate a basic understanding of some aspects of the present invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with an example embodiment, an image processing apparatus is provided, the apparatus comprising at least one processor and at least one memory including computer program code for one or more programs, the at least one memory and the computer program code configured to, with the at least one processor, cause the apparatus to perform at least the following: obtain a first image and a second image that at least partially illustrate the same real-world scene, wherein the first image comprises a visible light image and the second image comprises a thermal image; identify one or more spatial portions of the second image that represent a predefined temperature range; identify one or more spatial portions of the first image that illustrate the same portions of the real-world scene as illustrated in the identified one or more spatial portions of the second image; and derive, based on the first image, a composite image wherein the identified one or more spatial portions of the first image are emphasized.

In accordance with another example embodiment, an image capturing apparatus is provided, the apparatus comprising a camera assembly comprising a first imaging device for capturing visible light images and a second imaging device for capturing thermal images, the first and second cameras positioned with respect to each other such that they have at least partially overlapping respective fields of view; and an image processing apparatus according to the example embodiment described in the foregoing.

In accordance with another example embodiment, a search camera apparatus is provided, the apparatus comprising an elongated shaft, a display and an image capturing apparatus according to the example embodiment described in the foregoing, wherein the camera assembly is arranged at one end of the elongated shaft; the display is arranged in or close to the other end of the elongated shaft, and the image processing apparatus is further caused to provide the composite image for rendering on the display.

In accordance with another example embodiment, a method for image processing is provided, the method comprising: obtaining a first image and a second image that at least partially illustrate the same real-world scene, wherein the first image comprises a visible light image and the second image comprises a thermal image; identifying one or more spatial portions of the second image that represent a predefined temperature range; identifying one or more spatial portions of the first image that illustrate the same portions of the real-world scene as illustrated in the identified one or more spatial portions of the second image; and deriving, based on the first image, a composite image wherein the identified one or more spatial portions of the first image are emphasized.

According to another example embodiment, a computer program is provided, the computer program comprising computer readable program code configured to cause performing at least a method according to the example embodiment described in the foregoing when said program code is executed one or more computing apparatuses.

The computer program according to an example embodiment may be embodied on a volatile or a non-volatile computer-readable record medium, for example as a computer program product comprising at least one computer readable non-transitory medium having program code stored thereon, the program which when executed by one or more apparatuses causes the one or more apparatuses at least to perform the operations described hereinbefore for the computer program according to an example embodiment of the invention.

The exemplifying embodiments of the invention presented in this disclosure are not to be interpreted to pose limitations to the applicability of the appended claims. The verb "to comprise" and "to include" as well as their derivatives are used in this disclosure to refer to an open limitation that does not exclude the existence of also unrecited features. Moreover, it is to be understood that the use of "a" or "an", i.e. a singular form, throughout this document does not exclude a plurality. Furthermore, features described in the foregoing are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF DRAWINGS

Non-limiting exemplifying embodiments of the present invention and some of their advantages are explained in greater detail in the following with references to the accompanying drawings, in which:

FIG. 3 illustrates a method according to an example;

DETAILED DESCRIPTION OF NON-LIMITING EXAMPLE EMBODIMENTS

Figure 1:
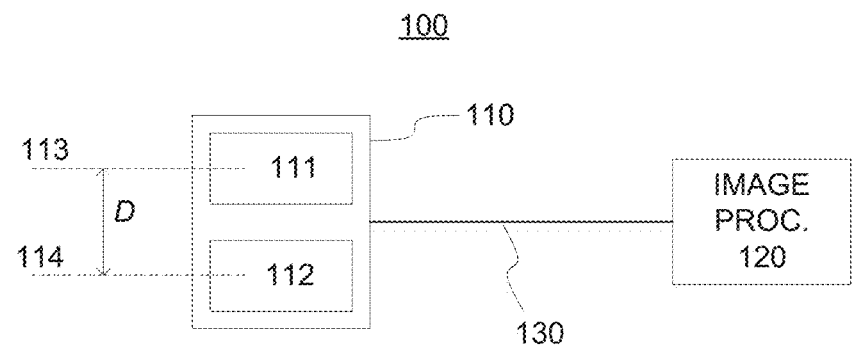
FIG. 1 illustrates a block diagram of some logical elements of an image capturing apparatus according to an example.

FIG. 1 illustrates a block diagram of some logical elements of an image capturing apparatus 100 according to an example. The image capturing apparatus 100 comprises a camera assembly 110 that is communicatively coupled to an image processing apparatus 120 via a communication link 130. In this regard, the camera assembly 110 comprises a first camera 111 and a second camera 112, each of which is communicatively coupled to the image processing apparatus 120. In other examples, the image capturing apparatus 100 may include further entities and/or some entities depicted in FIG. 1 may be combined with other entities.

The communicative coupling may enable transferring the respective images captured by the first camera 111 and the second camera 112 from the camera assembly 110 to the image processing apparatus 120 and enable transferring control information from the image processing apparatus 120 to the camera assembly 110. The communicative coupling may further enable transferring other information between the camera assembly 110 and the image processing apparatus 120. The communicative coupling may be provided, for example, using wired or wireless communication link between the camera assembly 110 and the image processing apparatus 120. As an example in this regard, the coupling may be provided via one or more electrical wires and/or one or more optical links such as optical fibers. In another example, the communicative coupling may be provided via usage of a short-range wireless communication technique known in the art, such the wireless local area networking according to IEEE 802.11 series of standards (e.g. Wi-Fi) or the personal area networking according to the Bluetooth™ standards. In a further example, the communicative coupling may be provided via usage of cellular communication technologies known in the art.

The image processing apparatus 120 may be arranged to compose an image based on respective image data received from the first camera 111 and/or the second camera 112. Hence, the image composed by the image processing apparatus 120 may comprise an image captured by the first camera 111 or a derivative thereof, an image captured by the second camera 112 or a derivative thereof, or a composite image composed based on a temporally aligned respective images captured by the first camera 111 and the second camera 112. In the following, for clarity and brevity of description, the term composite image is applied to refer to the image derived by the image processing apparatus 120 for presentation to the user, even though in some scenarios it may not comprise a true composite image but rather an image derived based on an image captured by the first camera 111 or on an image captured by the second camera 112.

FIG. 1 serves to illustrate logical components of the image capturing apparatus 100 and hence does not impose structural limitations concerning implementation of the image capturing apparatus 100. As an example, the first camera 111 and the second camera 112 may be provided as separate entities that are both included in the camera assembly 110, whereas in another example the first camera 111 and the second camera 112 may be provided as single entity where the first camera 111 and the second camera 112 may be independent sub-entities or where the first camera 111 and the second camera 112 may share some components within the single entity that serves to provide the first and second cameras 111, 112. As another example, the image processing apparatus 120 may be provided as one or more entities that are arranged to (possibly jointly) provide the functionality described in the foregoing. In this regard, the image processing apparatus 120 may be provided as respective hardware or as a combination of hardware and software arranged to implement the functionality described for the image processing apparatus 120 in the foregoing.

The first camera 111 may be provided for capturing images using visible light and the second camera 112 may be provided for capturing using infrared (IR) radiation. The first camera 111 that makes use of visible portion of the electromagnetic radiation spectrum may be also referred to e.g. as a visible light camera or as a normal camera, whereas the second camera 112 that makes use of the IR portion of the electromagnetic radiation spectrum may be also referred to e.g. as an infrared camera (an IR camera), as a thermographic camera or as a thermal imaging camera. The first camera 111 may be arranged to capture visible light images based on received electromagnetic radiation at a first range of wavelengths whereas the second camera 112 may be arranged to capture thermal images based received electromagnetic radiation at a second range of wavelengths, where the second range covers wavelengths that longer than those of the first range. Typically, the first range covers wavelengths approximately in the range from 400 to 700 nanometers (nm), whereas the second range covers wavelengths from 700 nm onwards, e.g. from 700 to 1000 nm. In some examples, the second range may further extend to longer wavelengths, e.g. up to wavelengths in the microwave range (e.g. up to several thousand nanometers).

The first camera 111 may comprise, for example, a digital camera unit or module arranged capture color images. In another example, the first camera 111 may comprise a digital camera unit or module arranged to capture monochrome images, such as grayscale images. In a further example, the first camera 111 may comprise a digital camera unit or module arranged to selectively capture one of color images or monochrome images in accordance with control information received from the image processing apparatus 120. While color images typically convey more accurate representation of the scene depicted in an image, especially in poor lighting conditions a monochrome image may provide improved image quality and hence the possibility of selecting a device making use of the first camera 111 of desired type (e.g. color or monochrome imaging) or the possibility to select the mode of operation for the first camera 111 (e.g. color or monochrome imaging) may provide an advantage under certain operating conditions. Monochrome imaging may be provided, for example, by using a short-wave IR range of wavelengths (at approximately from 900 to 1700 nm) instead of the first range described in the foregoing.

Suitable cameras for serving as the first and second cameras 111, 112 are known in the art and a respective suitable camera unit or camera module may be applied as the first camera 111 and the second camera 112. Consequently, details of the structure and/or operation of each of the first camera 111 and the second camera 112 are not provided in this disclosure since they are readily available for the skilled person apart from functional aspects that are relevant for describing some aspects of their usage as part of the camera assembly 110.

The first camera 111 and the second camera 112 are arranged in the camera assembly 110 in fixed positions with respect to each other such that they have at least partially overlapping respective fields of view. Advantageously, the overlap is as extensive as possible in the sense that the first camera 111 and the second 112 camera enable capturing respective images that depict substantially the same scene and hence depict substantially the same real-world objects. As an example, this may be provided by arranging the first camera 111 and the second camera 112 relatively close to each other such that a first optical axis 113 of an optical system of the first camera 111 is parallel or substantially parallel with a second optical axis 114 of an optical system of the second camera 112 at a predefined distance D therefrom. The concept of 'relatively close' depends on the physical size of the camera assembly 110 and the physical sizes of the first camera 111 and the second camera 112 and a desired or typical distance from the camera assembly 110 to the real-world objects of interest. In an example, the first camera 111 and the second camera 112 are arranged side-by-side as close to each other as possible to ensure maximizing the overlap between respective fields of view of the first camera 111 and the second camera 112. Consequently, as an example, the distance D between the first optical axis 113 and the second optical axis 114 may be in a range of a few centimeters.

Along the lines described in the foregoing, the camera assembly 110 may be operated under control of the image processing apparatus 120 in accordance with control information transferred via the communicative coupling, whereas the resulting respective images captured by the first camera 111 and the second camera 112 may be transferred from the camera assembly to the image processing apparatus 120 for analysis and/or processing therein. In particular, the camera assembly 110 may be arranged to capture and provide a respective single (still) image from the first and second cameras 111, 112 or it may be arranged to capture and provide a respective sequence of images (e.g. a respective video stream) from each of the first and second cameras 111, 112.

As example, the control information transferred from the image processing apparatus 120 to the camera assembly 110 may comprise an indication or command to initiate or terminate capturing respective streams of images (e.g. video streams) using the first and second cameras 111, 112 and providing these streams to the image processing apparatus 120. The indication or command to initiate the capturing and provision of the streams of images may comprise an indication of the frame rate to be applied in the streams of images provided from the camera assembly 110 to the image processing apparatus 120. In an example, the frame rate may be a suitable value selected in a range from 5 to 240 frames per second (fps), e.g. 30 fps. In another example, the camera assembly 110 may be arranged to employ a fixed predefined frame rate (e.g. 30 fps) and hence no indication of the applicable frame rate need to be provided in the indication or command that serves to initiate capturing and provision of the streams of images.

In the above example the applied frame rate is implicitly assumed to be the same for the first camera 111 and the second camera 112. In other examples, the respective frame rates of the first camera 111 and the second camera 112 may be selected or (pre)set independently of each other, such that the first and second cameras 112 may (also) employ different frame rates.

As another example, the control information may comprise an indication or a command to capture respective (still) images using the first camera 111 and the second camera 112 and to provide the resulting pair of images to the image processing apparatus 120.

As a further example, the control information may comprise a respective indication or command for adjusting or setting one of a plurality of camera parameters accordingly, such as image size, image resolution, focal length of the camera optics, etc. The control information may enable adjusting such camera parameters of the first camera 111 and the second camera 112 independently of each other or the camera parameter adjustment may at the same time adjust respective camera parameter of the first camera 111 and the second camera 112 in a similar manner.

As a yet further example, the control information may further comprise an indication whether to operate the first camera 111 in a color imaging mode or in a monochrome imaging mode, provided that the employed first camera 111 provides the possibility for such a selection. The monochrome imaging mode (that may rely e.g. on short-wave IR spectrum instead of the visible color spectrum, as described in the foregoing) may be useful for providing images of improved perceivable quality in low light conditions.

In a yet another example, the control information may comprise an indication or a command to enable or disable operation of the first camera 111 and/or the second camera 112. In case only one of the first and second cameras 111, 112 is enabled, operation of the image processing apparatus 120 results in composing an output image that is based on an image obtained from the enabled one of the first and second cameras 111, 112, while a true composite image results from operation of the image processing apparatus 120 in a scenario where both the first camera 111 and the second camera 112 are simultaneously or substantially simultaneously enabled.

In yet another example, the camera assembly 110 further comprises at least one light source for providing illumination within the fields of view of the first and second cameras 111, 112 to enable capturing useable images also in poor light conditions or in a dark space. In such an arrangement the control information may comprise an indication or a command to turn the light output from the at least one light source on or off.

The exemplifying indications or commands for operating one or both of the first and second cameras 111, 112 and/or other entities of the camera assembly 110 may be provided based on user input received via a user interface (UI) of a device that makes use of the image processing arrangement 100.

In the foregoing and in the following, the entities arranged for capturing the respective images using visible light and IR radiation are referred to as the first camera 111 and the second camera 112, respectively. This, however, is a choice made for editorial clarity and brevity of description and the present disclosure is not limited to implementations that make use of elements that are explicitly designated as respective camera units or camera modules and/or to approaches that make use of entities that are explicitly designated as visible light images or thermal images. In this regard, the first camera 111 generalizes into a first imaging device that comprises an array of sensors that are sensitive to visible light (e.g. an image sensor array provided as a semiconductor charge-coupled device (CCD) or as a CMOS sensor array) that enables capturing an array of pixel values that are descriptive of intensity (and possibly also the color) of visible light received at respective spatial positions of the sensor array. Along similar lines, the second camera 112 generalizes into a second imaging device that comprises an array of temperature-sensitive sensors (e.g. an array of IR sensors) that enables capturing an array of pixel values that are descriptive of temperature sensed at respective spatial positions of the sensor array. Each of the first and second imaging devices comprises respective further elements of an imaging device known in the art, such as a shutter assembly that enables suitable exposure of the sensor array and an optical system that enables focusing the incoming electromagnetic radiation at the sensor array.

Figure 2:
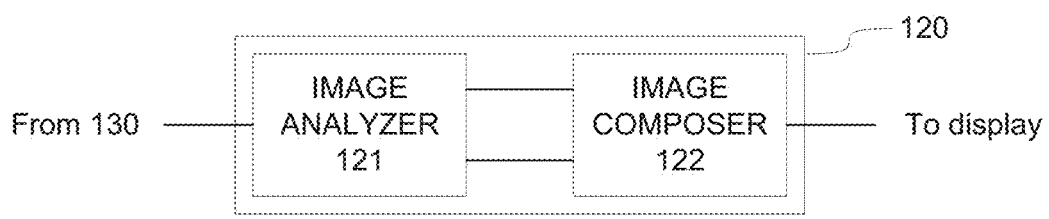
FIG. 2 illustrates a block diagram of some logical elements of the image processing apparatus according to an example.

FIG. 2 illustrates a block diagram of some logical elements of the image processing apparatus 120 according to an example. The image processing apparatus 120 comprises an image analyzer 121 and an image composer 122. In other examples, the image processing apparatus 120 include further entities and/or the image analyzer 121 and the image composer 122 may be combined with each other and/or with one or more other entities.

The image analyzer 121 receives the respective images from the first camera 111 and the second camera 112 of the camera assembly 110 via the communication link 130 and carries out an image analysis described in the following via non-limiting examples. An output of the image analysis is provided for the image composer 122 that composes a composite image based on at least an image captured by one of the first and second cameras 111, 112 and on the output of the image analysis. The image composer 122 further passes the composite image for presentation via the UI of a device that makes use of the image processing arrangement 100.

The image analyzer 121 and the image composer 122 may be arranged to jointly carry out a processing described herein as steps of a method 200 that is illustrated via a flowchart depicted in FIG. 3. In the following, the method 200 is described with references to deriving a single composite image based on a temporally aligned pair of images that comprises a first image captured using the first camera 111 of the camera assembly 110 and a second image captured using the second camera 112 of the camera assembly 110. However, the method 200 readily generalizes into deriving a sequence of composite images (e.g. a video stream) based on a series of temporally aligned pairs of images that each comprise a first image taken from a sequence of first images captured using the first camera 111 of the camera assembly 110 and a second image taken from a sequence of second images captured using the second camera 112 of the camera assembly 110. The method 200 may be varied in a plurality of ways, for example in accordance with examples pertaining to respective functionality of components of the image processing apparatus 120 provided in the foregoing and in the following.

The method 200 commences from obtaining a first image and a second image, as indicated in block 202. Along the lines described in the foregoing, the first image comprises an image captured by the first camera 111 and the second image comprises as image captured by the second camera 112. As described in the foregoing, the image processing apparatus 120 may receive one or more first images (e.g. a sequence of first images) via the communication link 130 from the first camera 111 and store the received images in a memory provided in the image processing apparatus 120. Along similar lines, the image processing apparatus 120 may receive one or more second images (e.g. a sequence of second images) via the communication link 130 from the second camera 112 and store the received images in the memory provided in the image processing apparatus 120.

As an example in this regard, the image processing apparatus 120 may be arranged to store and keep a predefined number of most recently captured first and second images in the memory, thereby deleting the oldest images from the memory as new images are received from the camera assembly 120. In one example, the predefined number may be one, resulting in the memory of the image processing apparatus storing only the most recently captured first image and the most recently captured second image. In another example, the image processing apparatus 120 may be arranged to store and keep in the memory the most recently captured images that cover a predefined time period (e.g. a period selected from a range from a fraction of a second to a few seconds). As a further example, the image processing apparatus 120 may be arranged to store and keep all first and second images received from the camera assembly 110 in its memory (e.g. until removed in response to a user action or command).

According to an example, the first and second images processed as a pair by the image processing apparatus 120 are captured at the same or substantially at the same time. According to another example, a given first image is 'paired' with an image of the sequence of second images having its capturing time closest to that of the given first image or, the other way around, a given second image is 'paired' with an image of the sequence of first images having its capturing time closest to that of the given second image. Consequently, a time aligned first and second images are obtained.

Due to the arrangement of the first and second cameras 111, 112 described in the foregoing (i.e. partially overlapping respective fields of view with respective optical axes 113 and 114 in parallel at the distance D from each other), the time aligned first and second images at least partially illustrate the same real-world scene. Consequently, the first and second images have an overlapping part that in both images illustrates the same real-world objects at the location of capturing the first and second images. However, due to the different characteristics of the images, i.e. the first image comprising a visible light image depicting a scene and the second image comprising a thermal image depicting at least partially the same scene, the second image provides information that is complementary to that provided by the first image (and vice versa).

The method 200 further comprises identifying one or more spatial portions of the second image that represent a predefined temperature range, as indicated in block 204. Since the second image comprises a thermal image, pixel values of the second image are directly proportional to the temperature of the real-world objects depicted therein, the second image enables locating illustrated objects based on their temperature. Herein, the identification of the one or more spatial portions that represent the predefined temperature range may include, for example, identifying one or more sets of pixel positions of the second image wherein the pixel values of the second image fall within a predefined range of pixel values that represents the predefined temperature range, thereby identifying illustrated real-world objects having their temperature within the predefined temperature range.

In an example, the predefined temperature range is provided as a pre-configured range of temperature values set upon manufacturing or calibrating the image capturing apparatus 100. In another example, the predefined temperature range is selected based on user input received via a user interface (UI) arranged for controlling at least some aspects of operation of the image capturing apparatus 100. In this regard, for example, (end points of) the predefined temperature range may be set based in user input received via the UI or (the end points of) the predefined temperature range may be selected from a plurality of predefined temperature ranges based on user input received via the UI.

The predefined temperature range of interest depends on the application of the image capturing apparatus 100. A non-limiting example of a predefined temperature range of interest comprises a range of temperatures of a living human body, e.g. from 30 to 50 degrees Celsius, from 15 to 44 degree Celsius or any other temperature range considered suitable for intended usage of the image capturing apparatus 100, which may be useful for example in search and surveillance applications that aim it identifying people depicted in the first and second images. Another example concerning the temperature range of interest comprises a range of combustion temperatures of different materials that typically appear in buildings, e.g. a range of temperatures from 300 to 1025 degrees Celsius.

The mapping between the predefined temperature range and the corresponding range of pixel values may be provided via a predefined temperature mapping function that may be defined via a calibration procedure upon manufacturing the device making use of the image capturing apparatus 100 and/or upon configuring or re-configuring the image capturing apparatus 100 (e.g. by the user or by maintenance personnel). As an example, the calibration procedure may comprise defining a mapping between a pixel value and a corresponding temperature for a plurality of temperatures within a range from a predefined minimum temperature to a predefined maximum temperature, where the predefined temperature range of interest falls within the overall range bound by the minimum and maximum temperatures (i.e. the range of calibrated temperatures covers also temperatures below and/or above the temperature range of interest). In another example, the calibration procedure may comprise defining the mapping between a pixel value and a corresponding temperature for a plurality of temperatures within a range from a lower limit of the temperature range of interest to an upper limit of the temperature range of interest, the calibration thereby only covering the temperature range of interest. In a further example, the calibration procedure may comprise defining the mapping between a pixel value and a corresponding temperature at the lower limit of the temperature range of interest and/or at the upper limit of the temperature range of interest, the calibration thereby only covering the limit(s) of the temperature range of interest.

The method 200 further comprises identifying one or more spatial portions of the first image that depict the same portions of the real-world scene as illustrated in the identified one or more spatial portions of the second image, as indicated in block 206. Consequently, the identified one or more spatial portions of the first image serve to depict the same real-world objects that are depicted in the identified one or more spatial portions of the second image. In this regard, since the spatial overlap between the first and second images is not complete, portions of the real-world scene depicted in some of the identified one or more spatial portions of the second image may not appear in the first image at all or may only partially appear in the image.

Since in the present example the first and second images are captured using, respectively, the first camera 111 and the second camera 112 that have their respective optical axes 113 and 114 in parallel at the distance D from each other, there is a straightforward mapping between a pixel position of the second image that illustrates a certain point of the real-world scene and corresponding pixel position of the first image that also illustrates the certain point of the real-world scene. This relationship between the pixel position of the second image may be defined via a spatial mapping function, which in the present example involves a translation of a pixel position along an axis. As an example, assuming that optical axes 113 and 114 are at the distance D from each other along an axis x, the spatial mapping from a pixel position of the second image to the corresponding pixel position of the first image involves translation or shift in the direction of the axis x. Further considering a pixel at position $(x_2, y_2)$ in the image plane of the second image, the corresponding position $(x_1, y_1)$ in the first image may be derived, for example, using the spatial mapping function $(x_1, y_1)=(x_2+D, y_2)$.

The above example assumes the first camera 111 and the second camera 112 being arranged side-by-side, resulting in a shift of translation of a pixel position that represents the same point of the real-world scene along the horizontal axis of the image plane. Such mapping of pixel positions readily generalizes into any (predefined) relative positioning of the first and second cameras 111, 112 with respect to each other. Hence, the spatial mapping of a pixel position of the second image into the corresponding spatial position of the first image may be generalized into mapping a pixel position of the second image into a corresponding pixel position of the first image by translating the pixel position of the second image by a predefined amount in a predefined direction. A generalized version of the spatial mapping function may be denoted, for example, as $(x_1, y_1)=(x_2+d_x, y_2+d_y)$, where $(d_x)^2+(d_y)^2=D^2$.

The spatial mapping function may be defined upon manufacturing the device making use of the image capturing apparatus 100 and/or upon configuring or re-configuring the image capturing apparatus 100. As a non-limiting example in this regard, the spatial mapping function may be found by using the first and second cameras 111, 112 to capture respective images of a scene that includes a single point in an uniform background and finding the shift (e.g. $d_x$ and $d_y$ as defined in the foregoing) that brings the point as illustrated in the second image into alignment with its illustration in the first image.

Consequently, the identification of the one or more spatial portions of the first image that illustrate the same portions of the real-world scene as illustrated in the identified one or more spatial portions of the second image may comprise using the spatial mapping function to find the one or more spatial portions of the first image based on the identified one or more spatial portions of the second image. In this regard, the spatial mapping function may be applied pixel-by-pixel, e.g. such that each set of pixel positions belonging to the one or more sets of pixel positions that define the identified one or more spatial portions of the second image is converted, pixel-by-pixel, into corresponding set of pixel positions of the first image via usage of the spatial mapping function, thereby obtaining the corresponding one or more sets of pixel positions of the first image that define the identified one or more spatial portions of the first image.

The method 200 further comprises deriving, based on the first image, a composite image wherein the identified one or more spatial portions of the first image are emphasized, as indicated in block 208. As described in the foregoing, the identified one or more spatial portions of the first image may be defined as respective one or more sets of pixels positions of the first image. As an example in this regard, the derivation of the composite image based on the first image may comprise generating a composite image where an emphasis image is overlaid on (a copy of) the first image, wherein the emphasis image comprises respective visual indications in spatial positions that spatially correspond to the identified one or more spatial portions of the first image while other parts of the emphasis image are transparent. Consequently, the visual indications introduced via the emphasis image serve to emphasize those real-world objects depicted in the first image that were found in the second image to represent the predefined temperature range. In another example, the emphasis may be provided via directly modifying the identified one or more spatial portions of the first image to include the respective visual indications, e.g. by replacing the image content in the identified one or more spatial portions of the first image with the respective visual indications or by modifying the image content in the identified one or more spatial portions of the first image in a predefined manner.

In an example, a visual indication introduced into the composite image e.g. via the emphasis image or via replacement of the corresponding image content in the respective identified spatial portion of the first image may comprise introducing respective image content as a predefined color and/or as a predefined pattern. In another example, a visual indication introduced into the composite image e.g. via modification of the respective identified spatial portion of the first image may comprise adding a predefined value to each pixel value within the respective identified spatial portion of the first image or subtracting a predefined value from each pixel value within the respective identified spatial portion of the first image to provide highlighting of the respective identified spatial portion of the first image while preserving at least some characteristics of the original illustration thereof provided in the first image.

In a further example, a visual indication introduced into the composite image e.g. via the emphasis image or via replacement of the corresponding image content in the respective identified spatial portion of the first image may comprise outlining the respective identified spatial portion of the first image using a line or border provided using a predefined color and/or a predefined pattern, e.g. by following or substantially following the shape of the outline of the respective identified spatial portion of the first image. In a further example, a visual indication introduced into the composite image e.g. via the emphasis image or via replacement of the corresponding image content in the first image may comprise modifying the image content around the respective identified spatial portion of the first images in a predefined manner, e.g. by at least partially enclosing the respective identified spatial portion of the first image inside a frame of predefined shape (e.g. a rectangular shape), where the frame may be provided using a predefined color and/or a predefined pattern. In yet further example, a visual indication introduced into the composite image e.g. via the emphasis image or via replacement of the corresponding image content in the respective identified spatial portion of the first image may comprise the image content of the respective identified spatial portion of the second image, whereas such a visual indication may be introduced via modification of the respective identified spatial portion of the first image e.g. by adding the image content of the respective identified spatial portion of the second image to the respective identified spatial portion of the first image or by subtracting the image content of the respective identified spatial portion of the second image from the respective identified spatial portion of the first image.

The method 200 may further comprise providing the composite image for rendering via a display, as indicated in block 210. The display may be provided as part of the UI arranged for controlling at least some aspects of operation of the image capturing apparatus 100. Consequently, the composite image provides the user of the image capturing apparatus 100 with an enhanced indication of real-world objects at the location of capturing the first and second images via emphasizing the real-world objects that are found to represent the temperature range of interest, thereby enabling improved and/or more efficient usage of the image capturing apparatus 100 e.g. in scenarios that involve recognizing real-world objects that exhibit the temperature range of interest at or close to said location.

Figure 4:
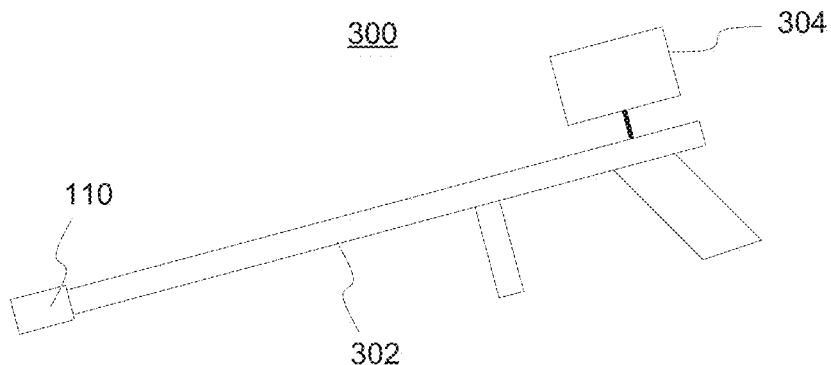
FIG. 4 schematically illustrates a search camera apparatus according to an example.

As a non-limiting example of a device that makes use of the image capturing apparatus 100, FIG. 4 schematically illustrates a search camera apparatus 300 according to an example. The search camera apparatus 300 comprises an elongated shaft 302 that has the camera assembly 110 arranged at or close to one end of the shaft 302 (e.g. a front end or a distal end) and a housing 304 that includes the image processing apparatus 120 and a display (possibly together with one or more other components of the UI) mounted at or close to the other end of the shaft 302 (e.g. a rear end or a proximal end). The communication link 130 may be provided, for example, via one or more electrical wires and/or via one or more optical links such as optical fibers provided within the shaft 302. The search camera apparatus 300 may be used e.g. such that the user places the front end of the shaft 302 such that the first and second cameras 111, 112 of the camera assembly 110 enable view to a location that cannot be directly observed or direct observation of which involves a risk, such as interior of a collapsed building or an underwater location. After such positioning the search camera apparatus 300 the user may activate the image capturing apparatus 100 therein e.g. to obtain a composite (still) image or a sequence of composite images (e.g. a video stream) for viewing via the display provided in the housing 304.

In a variation of the search camera device 300, instead of arranging the camera assembly 110 and the housing 304 that hosts the image processing apparatus 120 and the display in the shaft 302, the camera assembly 110 may be arranged in a first entity and the housing 304 may be arranged in a second entity that are moveable with respect to each other, thereby enabling improved flexibility in positioning the camera assembly 110 for observance of the location of interest. In such an arrangement, the first and second entities may be coupled to each other, for example, via a flexible cable that provides the communication link 130 (e.g. one or more electrical wires and/or one or more optical links such as optical fibers) therein. In another example, there is no physical link between first and second entities but the communication link 130 is provided via usage of a suitable wireless technique known in the art. Non-limiting examples in this regard include cellular communication technologies and short-range wireless communication techniques known in the art, such the wireless local area networking according to IEEE 802.11 series of standards (e.g. Wi-Fi) or the personal area networking according to the Bluetooth™ standards, thereby enabling further enhanced flexibility in positioning the camera assembly 110 for observation of the location of interest.

In the foregoing, the operation of the image capturing apparatus 100 and/or the method 200 is implicitly described with references to identification of one or more spatial portions that represent a single predefined temperature range of interest while spatial portions representing other temperature ranges may or may not be ignored. According to an example, the image capturing apparatus 100 and/or the method 200 may be varied such that the identification of one or more spatial portions of the second image (cf. block 204) concerns identifying a respective set of one or more spatial portions of the second image that each represent a respective one of a plurality of different predefined temperature ranges of interest. In this regard, the number of temperature ranges under consideration may be two, three, four, etc., i.e. any number considered applicable in view of the intended application of the image capturing apparatus 100 and/or the method 200. Consequently, the identification spatial portions of the first image that illustrate the same portions of the real-world scene as illustrated in the identified spatial portion(s) of the second image (cf. block 206) may be carried out for each set of one or more spatial portions identified in the second image, thereby deriving respective set of one or more spatial portions of the first image for each temperature range of interest. Moreover, the derivation of the composite image (cr. block 208) may comprise using a different manner of emphasizing the identified spatial portion(s) of the first image in each set, thereby providing different visual indications for each of the plurality of temperature ranges of interest (e.g. via using different colors, different patterns and/or differently colored/patterned lines or borders outlining the identified spatial portions of different sets, etc.).

In other words, with references to the method 200, the above-described example pertaining to the plurality of temperature ranges of interest may comprise carrying out operations pertaining to block 202 and 210 as described above in context of the method 200, whereas respective operations pertaining to blocks 204 to 206 may be repeated for each temperature range of interest to define the respective set of one or more spatial portions of the first image and the operations pertaining to block 208 may be carried out such that a different visual emphasis is applied for each set of one or more spatial portions, thereby providing different visual emphasis to each of the temperature ranges of interest.

As a non-limiting example, such a plurality of temperature ranges of interest may be applicable, for example, in context of the search camera device 300 designed and/or configured for locating humans in high-risk locations such as inside a collapsed building or in a mines rescue scenario. As a non-limiting example in this regard, the plurality of temperature ranges may comprise two or more of the following:
- a first temperature range of interest that represents a normal body temperature of a human (e.g. from 30 to 38 degrees Celsius);
- a second temperature range of interest that represents a less-than-normal body temperature of a human (e.g. from 15 to 30 degrees Celsius);
- a third temperature range of interest that represents an above-normal body temperature of a human (e.g. from 38 to 44 degrees Celsius);
- a fourth temperature range of interest that represents objects that may be harmful to a human due to excessive heat when in direct contact thereto or in immediate vicinity thereof for a prolonged period (e.g. from 44 to 60 degrees Celsius);
- a fifth temperature range of interest that represents objects that may be immediately harmful to a human due to excessive heat when in direct contact thereto or in immediate vicinity thereof (e.g. 60 degrees Celsius and above).

The above examples of applicable temperature ranges may enable, for example, an approach where persons having a body temperature that is higher or lower than the normal body temperature are emphasized in the composite image in a manner different from the emphasis applied to the persons having the normal body temperature to facilitate immediately identifying or distinguishing persons who may need urgent medical attention and/or an approach where high-temperature objects that are likely harmful to a human in direct contact thereto (or in immediate vicinity thereof) are emphasized in the composite image in a manner different from the emphasis applied to humans.

Figure 5:
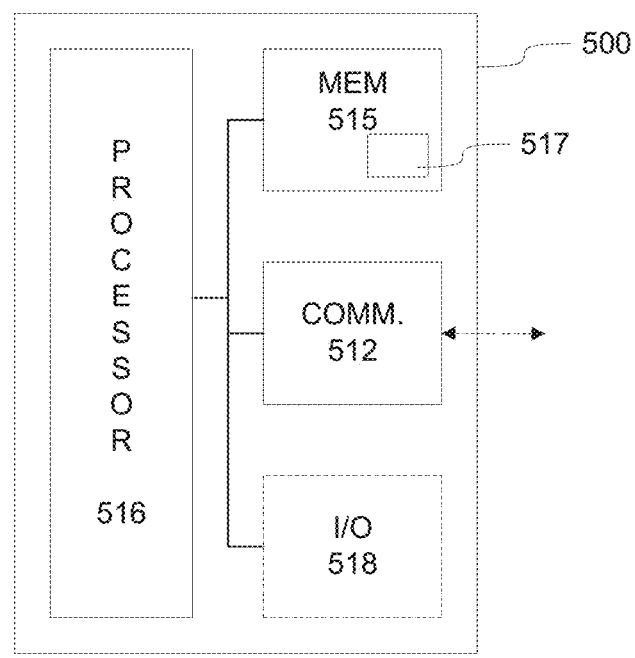
FIG. 5 illustrates a block diagram of some elements of an apparatus according to an example.

FIG. 5 illustrates a block diagram of some components of an exemplifying apparatus 500. The apparatus 500 may comprise further components, elements or portions that are not depicted in FIG. 5. The apparatus 500 may be employed e.g. in implementing the image processing apparatus 120 using a combination of hardware and software.

The apparatus 500 comprises a processor 516 and a memory 515 for storing data and computer program code 517. The memory 515 and a portion of the computer program code 517 stored therein may be further arranged to, with the processor 516, to implement at least some of the operations, procedures and/or functions described in the foregoing in context of the image processing apparatus 120.

The apparatus 500 comprises a communication portion 512 for communication with other devices. The communication portion 512 comprises at least one communication apparatus that enables wired or wireless communication with other apparatuses. A communication apparatus of the communication portion 512 may also be referred to as a respective communication means.

The apparatus 500 may further comprise user I/O (input/output) components 518 that may be arranged, possibly together with the processor 516 and a portion of the computer program code 517, to provide a user interface for receiving input from a user of the apparatus 500 and/or providing output to the user of the apparatus 500 to control at least some aspects of operation of the image processing apparatus 120. The user I/O components 518 may comprise hardware components such as a display, a touchscreen, a touchpad, a mouse, a joystick, a keyboard, and/or an arrangement of one or more keys or buttons, etc. The user I/O components 518 may be also referred to as peripherals. The processor 516 may be arranged to control operation of the apparatus 500 e.g. in accordance with a portion of the computer program code 517 and possibly further in accordance with the user input received via the user I/O components 518 and/or in accordance with information received via the communication portion 512.

Although the processor 516 is depicted as a single component, it may be implemented as one or more separate processing components. Similarly, although the memory 515 is depicted as a single component, it may be implemented as one or more separate components, some or all of which may be integrated/removable and/or may provide permanent/semi-permanent/dynamic/cached storage.

The computer program code 517 stored in the memory 515, may comprise computer-executable instructions that control one or more aspects of operation of the apparatus 500 when loaded into the processor 516. As an example, the computer-executable instructions may be provided as one or more sequences of one or more instructions. The processor 516 is able to load and execute the computer program code 517 by reading the one or more sequences of one or more instructions included therein from the memory 515. The one or more sequences of one or more instructions may be configured to, when executed by the processor 516, cause the apparatus 500 to carry out at least some of the operations, procedures and/or functions described in the foregoing in context of the image processing apparatus 120.

Hence, the apparatus 500 may comprise at least one processor 516 and at least one memory 515 including the computer program code 517 for one or more programs, the at least one memory 515 and the computer program code 517 configured to, with the at least one processor 516, cause the apparatus 500 to perform at least some of the operations, procedures and/or functions described in the foregoing in context of the image processing apparatus 120.

The computer programs stored in the memory 515 may be provided e.g. as a respective computer program product comprising at least one computer-readable non-transitory medium having the computer program code 517 stored thereon, the computer program code, when executed by the apparatus 500, causes the apparatus 500 at least to perform at least some of the operations, procedures and/or functions described in the foregoing in context of the image processing apparatus 120. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The specific examples provided in the description given above should not be construed as limiting. Therefore, the present invention is not limited merely to the embodiments described above. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An image processing apparatus comprising at least one processor and at least one memory including computer program code for one or more programs, the at least one memory and the computer program code configured to, with the at least one processor, cause the apparatus to perform at least the following:

obtain a first image and a second image that at least partially illustrate the same real-world scene, wherein the first image comprises a visible light image and the second image comprises a thermal image;

identify a respective set of one or more spatial portions of the second image that represent a respective one of a plurality of different predefined temperature ranges;

identify, for each set of one or more spatial portions of the second image, a respective set of one or more spatial portions of the first image that illustrate the same portions of the real-world scene as illustrated in the respective set of one or more spatial portions of the second image; and derive, based on the first image, a composite image, wherein the sets of one or more spatial portions of the first image are emphasized such that a different emphasis is applied for each set of one or more spatial portions of the first image.

2. The image processing apparatus according to claim 1, wherein said predefined temperature range is defined as a predefined range of pixel values, and identifying the one or more spatial portions of the second image comprises identifying pixel positions of the second image having pixel values that fall within said predefined range of pixel values.

3. The image processing apparatus according to claim 1, wherein said predefined temperature range represents one of the following:

temperatures between 30 to 50 degrees Celsius, temperatures between 15 to 44 degrees Celsius.

4. The image processing apparatus according to claim 1, wherein identifying the one or more spatial portions of the first image comprises using a predefined spatial mapping function to convert pixel positions within said identified one or more spatial portions of the second image into corresponding pixel positions of the first image.

5. The image processing apparatus according to claim 4, wherein said predefined spatial mapping function comprises mapping a pixel position of the second image into a corresponding pixel position of the first image by translating the pixel position by a predefined amount in a predefined direction.

6. The image processing apparatus according to claim 1, wherein deriving the composite image comprises:

generating an emphasis image comprising respective visual indications in spatial positions that spatially correspond to said identified one or more spatial portions of the first image, whereas other parts of the emphasis image are transparent; and overlaying the emphasis image on the first image.

7. The image processing apparatus according to claim 1, wherein deriving the composite image comprises modifying at least part of the image content of the first image in said one or more identified spatial portions of the first image in a predefined manner.

8. The image processing apparatus according to claim 7, wherein said modifying comprises one of the following:

replacing the image content in said one or more identified spatial portions of the first images with respective one or more visual indications, modifying the image content in said one or more identified spatial portions of the first images in a predefined manner, modifying the image content around said one or more identified spatial portions of the first images in a predefined manner.

9. An image capturing apparatus comprising:
- a camera assembly comprising a first imaging device for capturing visible light images and a second imaging device for capturing thermal images, the first and second cameras positioned with respect to each other such that they have at least partially overlapping respective fields of view; and
- an image processing apparatus according to claim 1, arranged to receive the first image and the second image from the first camera and the second camera, respectively.

10. The image capturing apparatus according to claim 9, wherein the first camera and the second camera are arranged to have their respective optical axes in parallel at a predefined distance from each other.

11. A search camera apparatus comprising an elongated shaft, a display and an image capturing apparatus according to claim 9, wherein
- the camera assembly is arranged at one end of the elongated shaft,
- the display is arranged in or close to the other end of the elongated shaft, and
- the image processing apparatus is further caused to provide the composite image for rendering on the display.

12. A method for image processing, the method comprising:
- obtaining a first image and a second image that at least partially illustrate the same real-world scene, wherein the first image comprises a visible light image and the second image comprises a thermal image;
- identifying a respective set of one or more spatial portions of the second image that represent a respective one of a plurality of different predefined temperature ranges;
- identifying, for each set of one or more spatial portions of the second image, a respective set of one or more spatial portions of the first image that illustrate the same portions of the real-world scene as illustrated in the respective set of one or more spatial portions of the second image; and
- deriving, based on the first image, a composite image wherein, the sets of one or more spatial portions of the first image are emphasized such that a different emphasis is applied for each set of one or more spatial portions of the first image.

13. The method according to claim 12, comprising using a camera assembly comprising a first camera for capturing visible light images and a second camera for capturing thermal images to capture, respectively, the first image and the second image,
wherein the first and second cameras are positioned with respect to each other such that they have at least partially overlapping respective fields of view.

14. A computer program product comprising computer readable program code tangibly embodied on a non-transitory computer readable medium, the program code configured to cause performing the method according to claim 12 when run a computing apparatus.

15. The image processing apparatus according to claim 2, wherein said predefined temperature range represents one of the following:
- temperatures between 30 to 50 degrees Celsius,
- temperatures between 15 to 44 degrees Celsius.

16. The image processing apparatus according to claim 2, wherein identifying the one or more spatial portions of the first image comprises using a predefined spatial mapping function to convert pixel positions within said identified one or more spatial portions of the second image into corresponding pixel positions of the first image.

17. The image processing apparatus according to claim 3, wherein identifying the one or more spatial portions of the first image comprises using a predefined spatial mapping function to convert pixel positions within said identified one or more spatial portions of the second image into corresponding pixel positions of the first image.

18. The image processing apparatus according to claim 2, wherein deriving the composite image comprises:
- generating an emphasis image comprising respective visual indications in spatial positions that spatially correspond to said identified one or more spatial portions of the first image, whereas other parts of the emphasis image are transparent; and
- overlaying the emphasis image on the first image.

19. The image processing apparatus according to claim 3, wherein deriving the composite image comprises:
- generating an emphasis image comprising respective visual indications in spatial positions that spatially correspond to said identified one or more spatial portions of the first image, whereas other parts of the emphasis image are transparent; and
- overlaying the emphasis image on the first image.

20. An image processing apparatus comprising at least one processor and at least one memory including computer program code for one or more programs, the at least one memory and the computer program code configured to, with the at least one processor, cause the apparatus to perform at least the following:
- obtain a first image and a second image that at least partially illustrate the same real-world scene, wherein the first image comprises a visible light image and the second image comprises a thermal image;
- identify one or more spatial portions of the second image that represent a predefined temperature range;
- identify one or more spatial portions of the first image that illustrate the same portions of the real-world scene as illustrated in the identified one or more spatial portions of the second image; and
- derive, based on the first image, a composite image, wherein the identified one or more spatial portions of the first image are emphasized, and
- wherein deriving the composite image comprises:
- generating an emphasis image comprising respective visual indications in spatial positions that spatially correspond to said identified one or more spatial portions of the first image, whereas other parts of the emphasis image are transparent; and
- overlaying the emphasis image on the first image.

* * * * *